(12) United States Patent
Hamilton, II et al.

(10) Patent No.: US 8,688,975 B2
(45) Date of Patent: Apr. 1, 2014

(54) CERTIFYING A VIRTUAL ENTITY IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 12/054,936

(22) Filed: Mar. 25, 2008

(65) Prior Publication Data
US 2009/0249061 A1 Oct. 1, 2009

(51) Int. Cl.
*H04L 29/06* (2006.01)

(52) U.S. Cl.
USPC .............................. 713/156; 713/175; 715/757

(58) Field of Classification Search
USPC ................ 713/155, 156, 158, 175; 726/5, 10; 715/757
See application file for complete search history.

(56) References Cited

U.S. PATENT DOCUMENTS

| | | | | |
|---|---|---|---|---|
| 6,119,229 | A * | 9/2000 | Martinez et al. | 726/28 |
| 6,986,046 | B1 * | 1/2006 | Tuvell et al. | 713/171 |
| 7,250,944 | B2 | 7/2007 | Anderson et al. | |
| 7,415,606 | B2 * | 8/2008 | Tuvell et al. | 713/151 |
| 7,451,308 | B2 * | 11/2008 | Karabulut | 713/156 |
| 7,840,903 | B1 * | 11/2010 | Amidon et al. | 715/757 |
| 8,060,829 | B2 * | 11/2011 | Jung et al. | 715/757 |
| 8,205,158 | B2 * | 6/2012 | Ganz et al. | 715/706 |
| 8,206,217 | B2 * | 6/2012 | Witchey | 463/29 |
| 8,225,220 | B2 * | 7/2012 | Barbaro Altieri | 715/757 |
| 8,285,638 | B2 * | 10/2012 | Jung et al. | 705/39 |
| 8,433,656 | B1 * | 4/2013 | Evans et al. | 705/59 |
| 2002/0184493 | A1 * | 12/2002 | Rees | 713/158 |
| 2003/0115132 | A1 * | 6/2003 | Iggland | 705/37 |
| 2003/0182573 | A1 * | 9/2003 | Toneguzzo et al. | 713/201 |
| 2004/0093492 | A1 * | 5/2004 | Daude et al. | 713/156 |
| 2005/0021477 | A1 * | 1/2005 | Krishnan et al. | 705/64 |
| 2005/0143174 | A1 * | 6/2005 | Goldman et al. | 463/42 |
| 2006/0047847 | A1 * | 3/2006 | Saccocio | 709/235 |
| 2006/0122917 | A1 * | 6/2006 | Lokuge et al. | 705/27 |
| 2007/0013691 | A1 * | 1/2007 | Jung et al. | 345/419 |
| 2007/0024613 | A1 * | 2/2007 | Jung et al. | 345/419 |
| 2007/0035548 | A1 * | 2/2007 | Jung et al. | 345/474 |
| 2007/0035549 | A1 * | 2/2007 | Jung et al. | 345/474 |
| 2007/0101276 | A1 * | 5/2007 | Yuen | 715/757 |

(Continued)

OTHER PUBLICATIONS

McGraw, Gary; Hoglund, Greg; "Online Games and Security", Security & Privacy, IEEE, vol. 5, Issue 5, Sep.-Oct. 2007, pp. 76-79.*

(Continued)

*Primary Examiner* — Victor Lesniewski
(74) *Attorney, Agent, or Firm* — William E. Schiesser; Hoffman Warnick LLC

(57) ABSTRACT

An invention for certifying a virtual entity in a virtual universe is disclosed. A virtual business may opt to register with a security certificate administration center to obtain a security certificate. A user of another virtual entity is provided with an ability to initiate a verifying process to check whether a security certificate symbol or a graphic resembling a security certificate symbol represents a valid security certificate. Virtual universe client and server software may be modified to enable a secured connection between the user and the security certificate administration center for the verification.

25 Claims, 3 Drawing Sheets

(56) References Cited

U.S. PATENT DOCUMENTS

| | | | |
|---|---|---|---|
| 2007/0162961 A1* | 7/2007 | Tarrance et al. | 726/5 |
| 2007/0294171 A1* | 12/2007 | Sprunk | 705/50 |
| 2008/0282090 A1* | 11/2008 | Leybovich | 713/182 |
| 2008/0303811 A1* | 12/2008 | Van Luchene | 345/419 |
| 2009/0106671 A1* | 4/2009 | Olson et al. | 715/757 |
| 2009/0116641 A1* | 5/2009 | Bokor et al. | 380/44 |
| 2009/0119605 A1* | 5/2009 | Bokor et al. | 715/757 |
| 2009/0119764 A1* | 5/2009 | Applewhite et al. | 726/9 |
| 2009/0132422 A1* | 5/2009 | Booth et al. | 705/52 |
| 2009/0161963 A1* | 6/2009 | Uusitalo et al. | 382/203 |
| 2009/0164518 A1* | 6/2009 | Ghafoor | 707/104.1 |
| 2009/0177979 A1* | 7/2009 | Garbow et al. | 715/757 |
| 2009/0210333 A1* | 8/2009 | Titus et al. | 705/35 |

OTHER PUBLICATIONS

Yee, George; Korba, Larry; Song, Ronggong; Chen, Ying-Chieh; "Towards Designing Secure Online Games", 20$^{th}$ International Conference on Advanced Information Networking and Applications, Apr. 18-20, 2006, pp. 44-48.*

Macedonia, Mike; "Generation 3D: Living in Virtual Worlds", Computer, vol. 40, Issue 10, Oct. 2007, pp. 99-101.*

* cited by examiner

CERTIFYING A VIRTUAL ENTITY IN A VIRTUAL UNIVERSE

TECHNICAL FIELD OF THE INVENTION

This invention relates generally to virtual universes, and more specifically to certifying a virtual entity in a virtual universe.

BACKGROUND OF THE INVENTION

Virtual universes or virtual worlds are computer-based simulated environments intended for its users to inhabit and interact via avatars, which are graphical representations that others can see. An avatar often takes the form of a cartoon-like human character. An agent is a user's account with a virtual universe, upon which the user can build an avatar. The agent is tied to the inventory of assets the user owns. These types of virtual universes are now common in massive multi-player online games, such as Second Life (Second Life is a trademark of Linden Research in the United States, other countries, or both). Avatars in the virtual universes can do a wide range of business and/or social activities. Virtual universes may include other virtual entities such as a virtual store, a virtual club, an article, etc. Each virtual entity including an avatar is assigned with a universally unique identification (UUID) in the virtual universe.

A variety of fraudulent behaviors may be conducted in virtual universes. For example, phishing refers to a form of fraud in which an entity, such as a website or a virtual store, masquerades as another entity by, e.g., copying the other entity's appearance and/or other characteristics. The goal of the fraudulent emulation is to, e.g., lure visitors into providing personal or financial information, which the fraudulent/phishing entity may use for monetary gains.

SUMMARY OF THE INVENTION

In one embodiment, there is a method for certifying a virtual entity in a virtual universe. In this embodiment, the method comprises: providing a certifying mechanism for a first virtual entity to certify with a security certificate administration center and be granted a security certificate; providing a checking mechanism for a second virtual entity to initiate a verification process to verify whether a symbol associated with a third virtual entity represents a valid security certificate; passing the initiated verification process to the security certificate administration center to determine the validity; and outputting a result of the validity determination.

In a second embodiment, there is a system for certifying a virtual entity in a virtual universe. In this embodiment, the system comprises: a certifying mechanism for a first virtual entity to certify with a security certificate administration center and be granted a security certificate; and a checking mechanism for a second virtual entity to initiate a verification process to verify whether a symbol associated with a third virtual entity represents a valid security certificate, the checking mechanism passes the initiated verification process to the security certificate administration center to determine the validity.

In a third embodiment, there is a computer program product embodied in a computer readable medium. In this embodiment, the computer program product comprises computer usable program code which, when executed by a computer system, enables the computer system to: provide a certifying mechanism for a first virtual entity to certify with a security certificate administration center and be granted a security certificate; provide a checking mechanism for a second virtual entity to initiate a verification process to verify whether a symbol associated with a third virtual entity represents a valid security certificate; pass the initiated verification process to the security certificate administration center to determine the validity; and output a result of the validity determination.

In a fourth embodiment, there is a method for providing a system for certifying a virtual entity in a virtual universe. In this embodiment, the method comprises at least one of: creating, maintaining, deploying or supporting a computer infrastructure being operable to: provide a certifying mechanism for a first virtual entity to certify with a security certificate administration center and be granted a security certificate; provide a checking mechanism for a second virtual entity to initiate a verification process to verify whether a symbol associated with a third virtual entity represents a valid security certificate; pass the initiated verification process to the security certificate administration center to determine the validity; and output a result of the validity determination.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

1. System Overview

Figure 1:
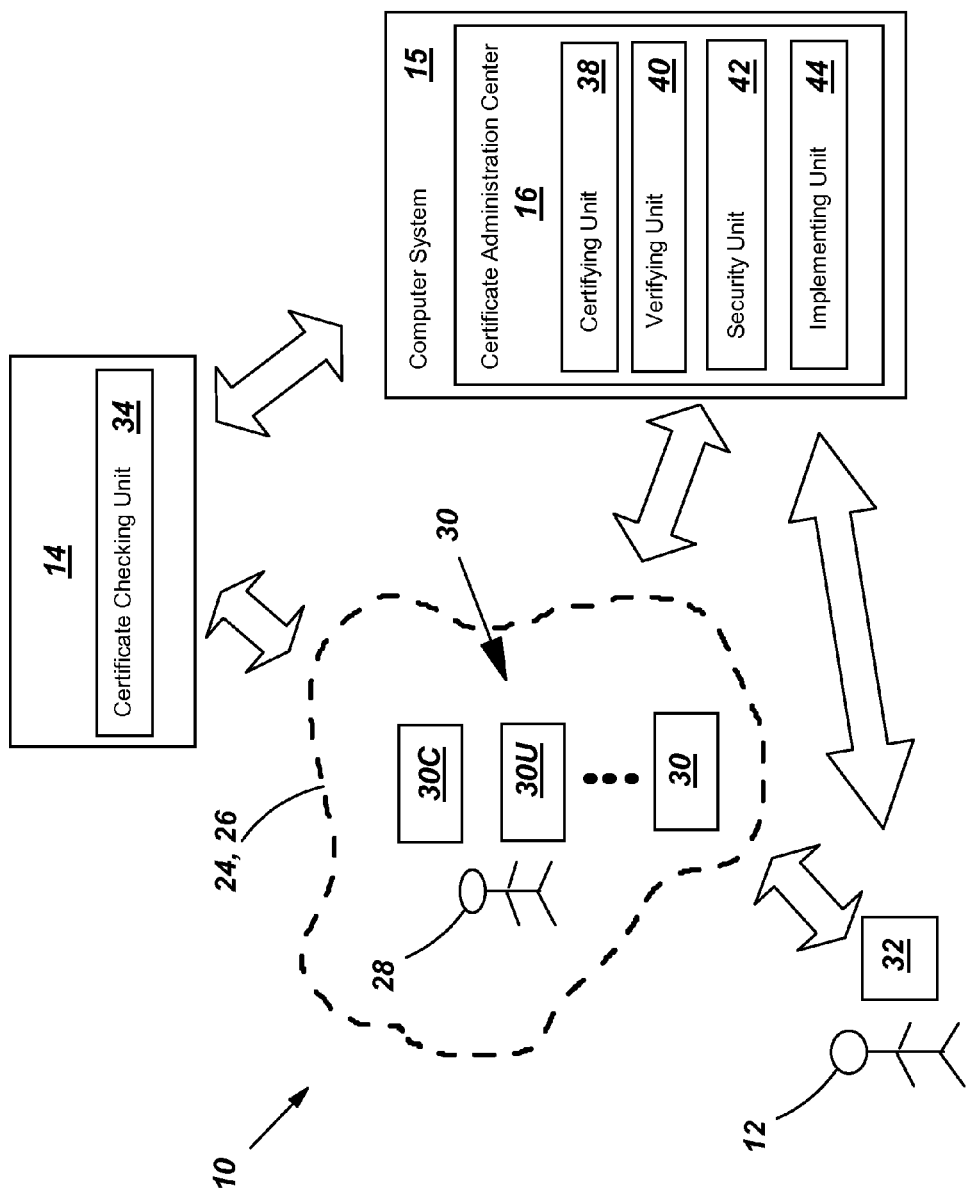
FIG. 1 shows a system according to one embodiment of this invention.

FIG. 1 shows a block diagram of a system 10 according to an embodiment. System 10 includes a virtual world user(s) 12, a virtual world server(s) 14 and a certificate administration center 16. Virtual world server 14 supports a virtual universe 24 including at least one virtual region 26 (shown together with virtual universe 24) where virtual world user 12 may conduct activities via a virtual world representation (avatar) 28. Virtual universe 24 may also include various other virtual entities 30, such as a virtual store. In this description, other virtual entities 30 and avatars 28 may be generally referred to as a virtual entity 28/30, unless specifically indicated otherwise. To this extent, in the current description, virtual entity 28/30 refers to any virtual representation in virtual universe 24 including, for example, avatar 28, virtual region 26 and/or a virtual place, e.g., a virtual store, within virtual region 26, an article in virtual region 26, such as a car of avatar 28, etc. Virtual entity 28/30 may either be certified virtual entity or uncertified as will be described here. FIG. 1 shows certified other virtual entity 30C and uncertified other virtual entity 30U (30C and 30U may be generally referred to as virtual entity 30). Avatar 28 may also be certified. In operation, user 12 attends virtual universe 24 through a virtual world client/agent 32, e.g., a virtual world account established through, e.g., a personal computer, communicatively coupled to virtual world server 14. Virtual entities 28/30 interact with one another in the virtual activities.

Virtual world server 14 may include a certificate checking unit 34 which is communicatively coupled to an interface of virtual world client/agent 32 such that the interface may be modified by certificate checking unit 34 to enable a secured communication to/through certificate checking unit 34 which may trigger the operation of certificate checking unit 34.

Certificate administration center 16 may reside in a computer system 15 and may include a certifying unit 38, a verifying unit 40, a security unit 42, and an implementation unit 44. Other component(s) required for the operation of certificate administration center 16 may also be included as is understood in the art.

According to an embodiment, computer system 15 can comprise any general purpose computing article of manufacture capable of executing computer program code installed thereon to perform the process described herein. The computer infrastructure can also comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

As should be appreciated, virtual world server 14 and certificate administration center 16 and components thereof may be positioned at the same physical location or may be at different physical locations. According to an embodiment, certificate administration center 16 is independent/separate to virtual universe 24 and/or virtual world server 14. However, other embodiment is also possible. For example, certificate administration center 16 or part of its functional components may be provided by virtual world server 14. The interaction of system 10 components will be described herein in detail.

2. Operation Methodology

Figure 2:
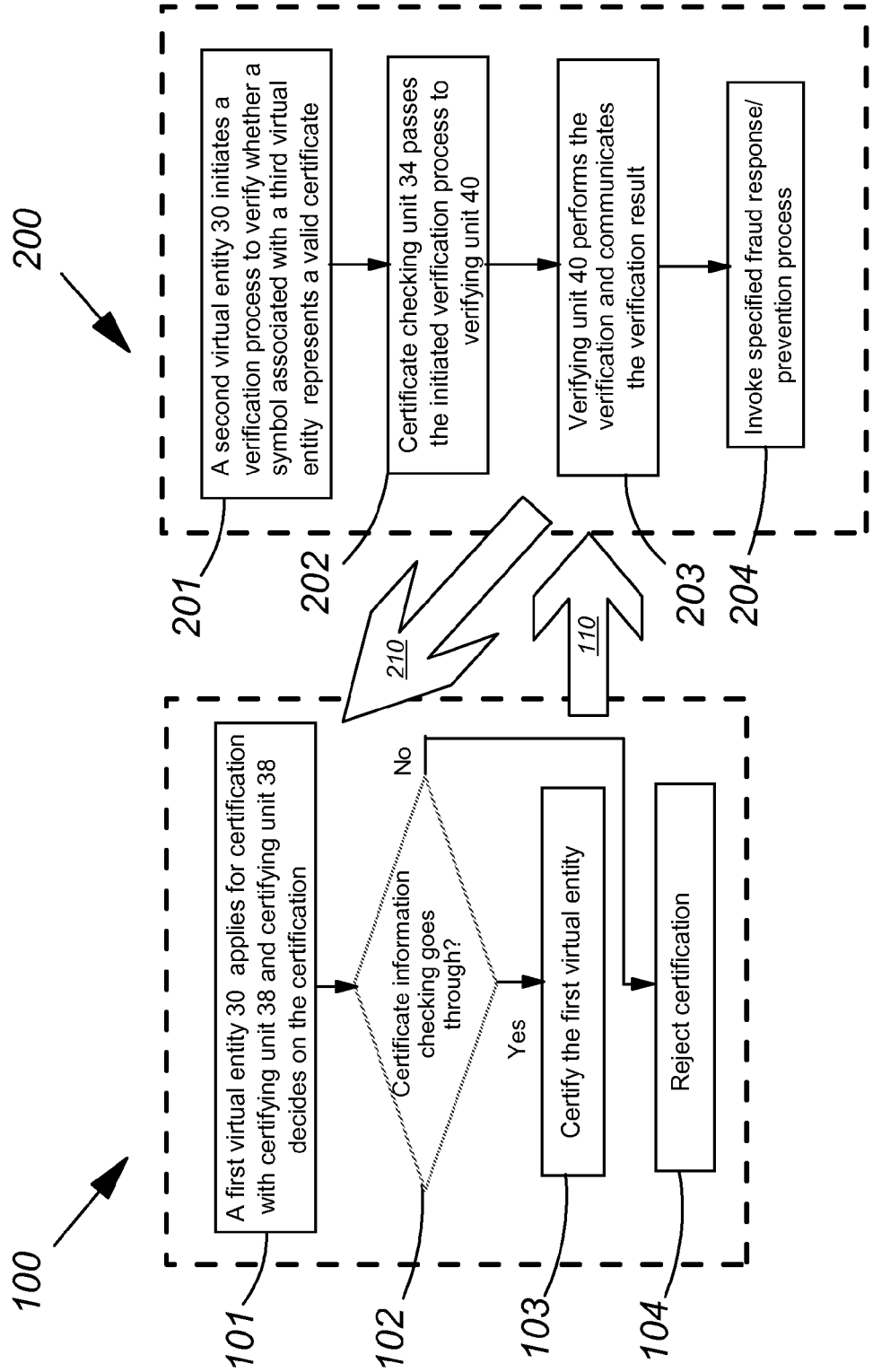
FIG. 2 shows embodiments of an operation of the system of FIG. 1 according to the invention.

An embodiment of the interaction/operation of system 10 components is shown in the flow diagram of FIG. 2. Referring to FIG. 2, the interaction may include a certifying process 100 and a verifying process 200 shown with two dotted blocks in FIG. 2. The two processes 100, 200 are related to the extent that information/result of each process may be used in the operation of the other process. However, the operation of each process may be performed independently to the operation of the other process. Referring to FIGS. 1-2, collectively, certifying process 100 may include multiple sub-processes. In sub-process 101, a (first) virtual entity 30 may apply for certification with certifying unit 38 to be, e.g., authentic, and certifying unit 38 may decide on the certification. The certifying may be initiated by a user 12 of the (first) virtual entity 30 or another authorized user 12 to register/apply for certification before certifying unit 38. Certifying unit 38 may then independently check information of the (first) virtual entity 30 required for certification, e.g., company name, virtual entity name, contact information, domain name, IP address range, credit card authorization, etc. If the checking goes through, i.e., "Yes" for sub-process 102, in sub-process 103, certifying unit 38 may certify the (first) virtual entity 30 as, e.g., authentic, and grant the (first) virtual entity 30 a security certificate, which indicates that the information of the first virtual entity 30 can be relied upon in, e.g., transactions. To this extend, the (first) virtual entity 30 becomes a certified virtual entity 30C. For example, certifying unit 38 may associate the (first) certified virtual entity 30C with the certified certificate information, the user 12 registering/applying for certifying, and/or the universally unique identification of the (first) virtual entity 30. Other information regarding the certification may also be included, such as the certification date and expiration date. According to an embodiment, a certificate symbol may be associated with the (first) certified virtual entity 30C upon a successful certification. The certificate symbol may be capable of being viewed automatically or upon request by another virtual entity 28/30, e.g., an avatar 28, visiting the certified (first) virtual entity 30C. According to an embodiment, the certificate symbol may be locked to the (first) certified virtual entity 30C such that another virtual entity 30 cannot take or copy the certificate symbol. Any solution may be used to achieve the locking. For example, the certificate symbol (e.g., the data supporting the certificate symbol) may be uniquely associated with the UUID of the (first) certified virtual entity 30C that holds the certificate. All the information of the certification may also be communicated to/saved and retrievable by verifying unit 40, as represented by arrow 110.

If the checking of the certificate information does not go through successfully, i.e., "No" at sub-process 102, certifying unit 38 may reject the applied certification in sub-process 104.

As represented by arrow 210, information/result of process 200 may also be communicated to/saved and retrievable by certifying unit 38 in sub-process 101, as will be described further herein. Accordingly to an embodiment, the certifying process 100 and the data communications 110, 210 are implemented in a secured manner. For example, security unit 42 may use cryptography to secure the data communication(s) between and among various components of system 10.

Verifying process 200 may also include multiple sub-processes. In sub-process 201, a (second) virtual entity 28/30, e.g., an avatar 28, initiates a verification process to verify whether a symbol associated with a (third) virtual entity 30 represents a valid security certificate. The symbol may be a certificate symbol or may be a symbol that looks like a certificate symbol. The (second) virtual entity 28/30, e.g., an avatar 28, may initial the verification process by clicking on the symbol or by communicating such an initiation request in other manner, e.g., through an interface of the agent/client 32 to certificate checking unit 34.

In sub-process 202, certificate checking unit 34 may pass the initiated verification process to verifying unit 40 of certificate administration center 16. Any method may be used to implement the passing. For example, the passing may be achieved by modifying the current virtual universe server software. In addition, by further modifying the client/agent 32 software of the (second) virtual entity 28, a secured connection may be established between the (second) virtual entity 28 and verifying unit 40. Security unit 42 may secure the connection by, e.g., cryptography. Establishing of a secured connection can be achieved using current technologies. Note that as a virtual entity 28/30 is a representation of user 12 rendered by agent/client 32, the establishing of a secured connection between the (second) virtual entity 28/30 with verifying unit 40 includes the situation that the connection is between user 12 or agent/client 32 and verifying unit 40. Through the secured connection, the information of the (third) virtual entity 30 whose symbol is being checked will be communicated to verifying unit 40. For example, the UUID, location coordinate, store name, and user ID of the (third) virtual entity 30 may be communicated to verifying unit 40 for verification.

In sub-process 203, verifying unit 40 performs the verification and communicates the verification result to the (second) virtual entity 28 requesting/initiating the verification and/or an administrator of virtual universe 24. The verifying may be implemented by comparing the received information of the (third) virtual entity 30 to be checked with the saved information of the certified (first) virtual entities 30. If the received information of the (third) virtual entity 30 matches the saved information of a (first) virtual entity, the symbol under checking will be treated as representing a valid certificate. If no such matching is found, the symbol under checking will be treated as invalid.

The communication of the verification result to the (second) virtual entity 28 initiating the verification process may be implemented in various manners. For example, a secured communication may be generated by verifying unit 40 and sent to the agent/client 32 of the (second) virtual entity 28. Alternative, verifying unit 40 may control the client/agent 32 of the (second) virtual entity to create a message separately to the rendering of the virtual universe. For example, the client/agent 32 may render the symbol to green color to indicate a valid certificate and to red color to indicate an invalid certificate. In addition, details of the invalid certificate may also be included in the communication. For example, it may be indicated that the symbol under checking is a certificate symbol but does not belong to the (third) virtual entity 30, or that the certificate symbol belongs to the (third) virtual entity but is expired.

Figure 3:
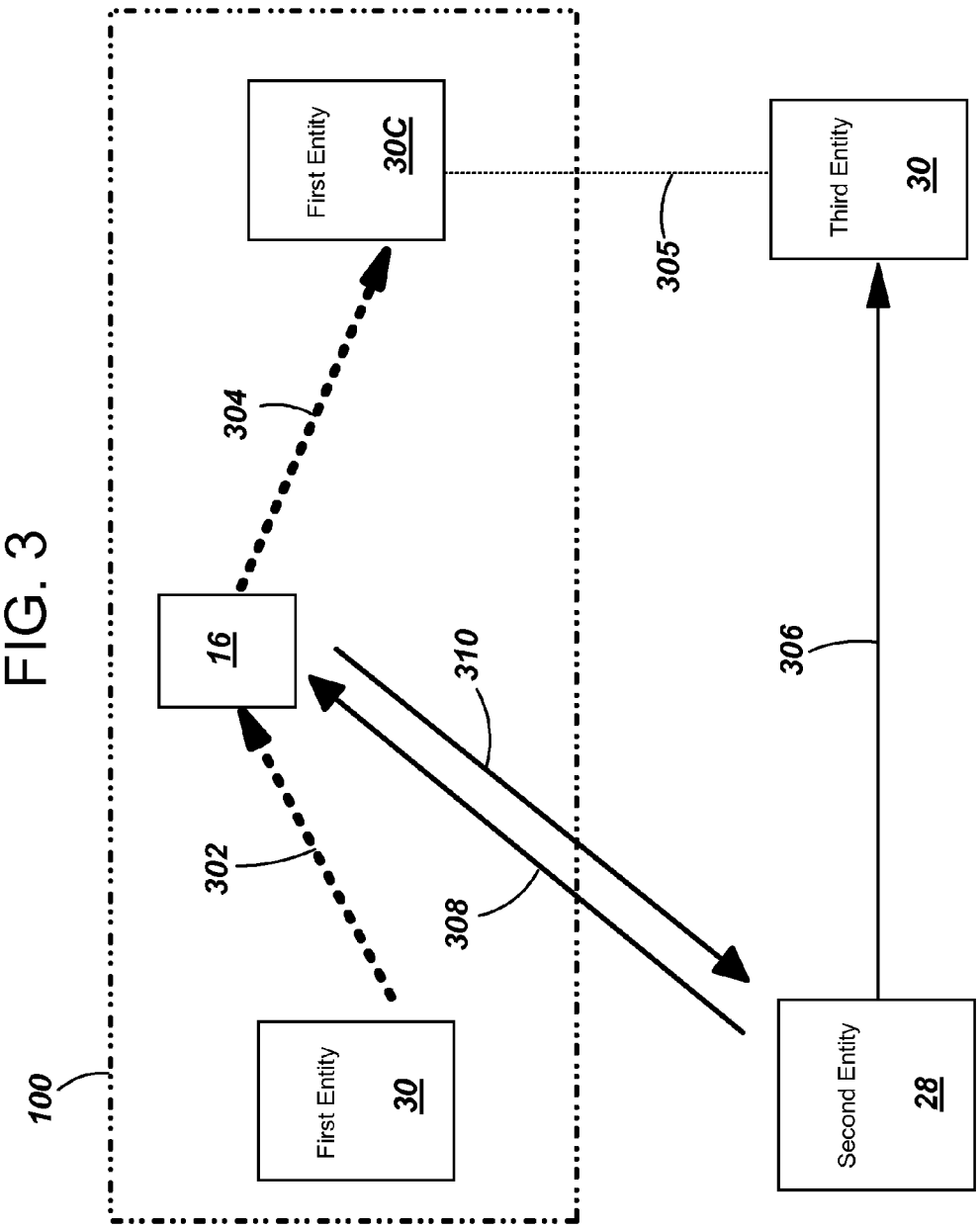
FIG. 3 shows embodiment of the communications between virtual entities.

FIG. 3 further illustrates the communications between and among the first, second and third virtual entities 28/30. In FIG. 3, dotted box 100 represents the certifying process 100 where first virtual entity 30 (may also be an avatar 28) applies for certification represented by communication link 302 and a security certificate is granted to the first virtual entity 30 as represented by communication link 304. Thus the first virtual entity 30 becomes a certified virtual entity 30C. Second virtual entity, e.g., avatar 28, usually does not have knowledge of the certifying process 100 that involves the first virtual entity 30C. When the second virtual entity 28 visits a third virtual entity 30 (for illustrative purposes, the third virtual entity 30 is shown as a certified first virtual entity 30C as represented by dotted relationship link 305), the second virtual entity 28 can only see a graphic similar to a certificate symbol (as represented by communication link 306) but cannot know whether the graphic represents a valid security certificate, i.e., whether the third virtual entity 30 is a certified first virtual entity 30C. The verification process 200 enables the second virtual entity 28 to establish a secured communication (as represented by communication link 308) to check with certificate administration center 16 to verify the symbol and certificate administration center 16 may communicate the verification result, here that the third virtual entity 30 is a certified first virtual entity 30C, to the second virtual entity 28, as represented by communication link 310.

Referring back to FIG. 2, in sub-process 204, implementing unit 44 may coordinate to administrator of virtual universe 24/virtual world server 14 to invoke specified fraud response/prevention process(es) in the case that the (third) virtual entity 30 is determined as using an invalid symbol. Any response may be implemented. For example, the account of the (third) virtual entity 28/30 may be suspended. For another example, virtual universe features available to the entity 28/30 may be revoked or reduced, such as revoking rights to engage in transactions, to chat, to move beyond specific boundary coordinates, etc. In addition, the information regarding the use of the invalid symbol may be communicated to/retrieved by certifying unit 38 to be used in future certifying processes. Arrow 210 represents the information transmission. For example, a record of using invalid certificate symbol by a virtual entity may have negative impact on the virtual entity in applying for a certificate in process 100.

3. Conclusion

While shown and described herein as a method and system for certifying a virtual entity in a virtual universe, it is understood that the invention further provides various alternative embodiments. For example, in an embodiment, the invention provides a program product stored on a computer-readable medium, which when executed, enables a computer infrastructure to certify a virtual entity in a virtual universe. To this extent, the computer-readable medium includes program code, such as certificate checking unit 34 and/or certificate administration center 16 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, and/or as a data signal traveling over a network (e.g., during a wired/wireless electronic distribution of the program product).

In another embodiment, the invention provides a method of providing a system for certifying a virtual entity in a virtual universe. In this case, a computer system, such as administrator computer system 15 and virtual world server 14 (FIG. 1), can be generated (e.g., created, deployed, maintained, having made available to, supported etc.) and one or more programs/systems, e.g., certificate administration center 16 and/or certificate checking unit 34 (FIG. 1), for performing the process described herein can be obtained (e.g., created, purchased, used, modified, etc.) and deployed to the computer system. To this extent, the deployment can comprise one or more of: (1) installing program code on a computing device, such as computer system 15 (FIG. 1), from a computer-readable medium; (2) adding one or more computing devices to the computer system; and (3) incorporating and/or modifying one or more existing devices of the computer system, to enable the computer system to perform the process described herein.

It should be appreciated that the teachings of the present invention could be offered as a business method on a subscription or fee basis. For example, a certificate administration center 16 (FIG. 1), and a computing device comprising certificate administration center 16 (FIG. 1) could be created, maintained and/or deployed by a service provider that offers the functions described herein for customers. That is, a service provider could offer to provide a service to conduct a marketing activity as described above.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for certifying a virtual entity to conduct transactions in a virtual universe, comprising:
providing a secure certifying system configured to enable a first virtual entity controlled by a user to certify an identity of the first virtual entity with an independent certificate administration center and be granted a security certificate based on the certification of the identity of the first virtual entity using a computer system including at least one computing device, wherein the certification of the identity of the first virtual entity is performed to ensure security for a real-world transaction,
wherein the user controls the first virtual entity via an agent computer communicatively coupled to a virtual universe server,
wherein the certifying includes independently checking a first data set for the first virtual entity and associating a security certificate symbol with the first virtual entity, requirements of the first data set defined by the certifying system,
wherein the security certificate symbol is displayed to be viewed by a second virtual entity in the virtual universe, and
wherein the certificate administration center is configured to initiate operation of the certifying system and modify an interface of the agent computer to enable secure communication between the agent computer and the certificate administration center;
providing a checking system initiated by the second virtual entity by acting on the displayed security certificate symbol to initiate a process of verification of the certification to verify whether the security certificate symbol associated with the first virtual entity represents a valid security certificate using the computer system,
wherein the checking system is configured to modify software of the agent computer and is deployed in the virtual universe server, and
wherein the checking system is further configured to control the agent computer to generate a verification message separate from rendering of the virtual universe;
passing the initiated process of verification to the certificate administration center to determine the validity using the computer system,
wherein the process of verification includes comparing the first data set of the first virtual entity with a second data set of the first virtual entity,
wherein the second data set is obtained from the first virtual entity at initiation of the process of verification;
outputting a result of the validity determination using the computer system; and
allowing the second entity to access the result of the validity determination.

2. The method of claim 1, wherein the outputting the result of the validity determination includes adjusting an appearance of the security certificate symbol in the virtual world based upon the validity determination and displaying the certification date in the virtual universe, and
wherein the first virtual entity is a representation in the virtual universe of the user.

3. The method of claim 1, wherein the first virtual entity is a virtual store or a virtual representation of the user in the virtual universe and the security certificate symbol is locked with the first virtual entity and is viewable by the second virtual entity either automatically or by request, and
wherein the first data set includes at least one of: a domain name, an IP address range, or a credit card authorization.

4. The method of claim 1, wherein the certifying includes associating the security certificate with at least one of: security certificate information, a user applying the security certificate for the first virtual entity, or a universally unique identification of the first virtual entity, and
wherein the security certificate symbol is configured to be viewed upon the request of the second virtual entity.

5. The method of claim 1, wherein the first virtual entity is configured to conduct a transaction with the second virtual entity in the virtual world for the user, and the outputting of a result of the validity determination includes:
displaying in the virtual universe a security certificate expiration date; and
storing the validity determination in the computer system for use in future certifying processes for the first virtual entity, the validity determination including the data set for the first virtual entity.

6. The method of claim 1, wherein the first virtual entity is an avatar and the outputting a result of the validity determination includes suspending or limiting at least one feature of an account of a first entity determined to be using an invalid certificate, and wherein the security certificate symbol is locked to the first virtual entity.

7. The method of claim 1, wherein the outputting a result of the validity determination includes providing details of an invalid certificate for use by the second virtual entity, and wherein the outputting the result is sent to the second virtual entity as a message separate to the rendering of the virtual universe.

8. The method of claim 1, wherein the checking system is deployed in the virtual universe server and is configured to control the agent computer to generate a verification message separate to rendering of the virtual universe, and wherein the verification message indicates at least one of: that the security certificate symbol is valid but does not belong to the first virtual entity or that the security certificate symbol is expired.

9. A computer system for certifying a virtual entity in a virtual universe, comprising:

a secure certifying system configured to enable a first virtual entity controlled by a user to certify an identity of the first virtual entity with an independent security certificate administration center and be granted a security certificate based on the identity of the first virtual entity, wherein the certification of the identity of the first virtual entity is performed to ensure security for a real-world transaction, wherein the user controls the first virtual entity via an agent computer communicatively coupled to a virtual universe server, wherein the certifying includes independently checking a first data set for the first virtual entity and associating a security certificate symbol with the first virtual entity, requirements of the first data set defined by the certifying system, wherein the security certificate symbol is displayed to be viewed by a second virtual entity in the virtual universe which is interested in conducting a transaction with the first virtual entity, and wherein the certificate administration center is configured to initiate operation of the certifying system and modify an interface of the agent computer to enable secure communication between the agent computer and the certificate administration center; and a checking system initiated by the second virtual entity by acting on the displayed security certificate symbol to initiate a process of verification of the certification to verify whether the security certificate symbol associated with the first virtual entity represents a valid security certificate, the verification process including comparing the first data set of the first virtual entity with a second data set of the first virtual entity, wherein the checking system passes the initiated process of verification to the security certificate administration center to determine the validity and is configured to modify software of the agent computer, wherein the checking system is further configured to control the agent computer to generate a verification message separate to rendering of the virtual universe, and wherein the second entity is allowed to access a result of the validity determination.

10. The computer system of claim 9, wherein the checking system is further configured to adjust an appearance of the security certificate symbol in the virtual world based upon a validity determination, wherein the first virtual entity is a representation of the user in the virtual world, and wherein the first virtual entity and the second virtual entity are configured to conduct a transaction.

11. The computer system of claim 9, wherein the first virtual entity is a virtual store and the certifying system locks the security certificate symbol with the first virtual entity and displays the certification date in the virtual universe.

12. The computer system of claim 9, wherein the certifying system associates the security certificate with at least one of: security certificate information, a user applying the security certificate for the first virtual entity, or a universally unique identification of the first virtual entity.

13. The computer system of claim 9, wherein an expiration date of the security certificate is displayed in the virtual universe and a result of a validity determination including the data set for the first virtual entity is stored in the computer system for use in future certifying processes for the first virtual entity.

14. The computer system of claim 9, wherein the checking system establishes a secured connection between the second virtual entity and the security certificate administration center.

15. The computer system of claim 14, wherein the checking system is further configured to provide details of an invalid certificate for use by the second virtual entity.

16. The computer system of claim 9, wherein the checking system is deployed in the virtual universe server and is configured to control the agent computer to generate a verification message separate to rendering of the virtual universe.

17. A computer program product embodied in a non-transitory computer readable medium comprising:

computer usable program code which, when executed by a computer system, enables the computer system to:

provide a secure certifying system configured to enable a first virtual entity controlled by a user to certify an identity of the first virtual entity with an independent security certificate administration center and be granted a security certificate based on the identity of the first virtual entity, wherein the certification of the identity of the first virtual entity is performed to ensure security for a real-world transaction, wherein the user controls the first virtual entity via an agent computer communicatively coupled to a virtual universe server, wherein the certifying includes independently checking a first data set for the first virtual entity and associating a security certificate symbol with the first virtual entity, requirements of the first data set defined by the certifying system, wherein the security certificate symbol is displayed to be viewed by a second virtual entity in the virtual universe which is interested in conducting a transaction with the first virtual entity, and wherein the certificate administration center is configured to initiate operation of the certifying system and modify an interface of the agent computer to enable secure communication between the agent computer and the certificate administration center;

provide a checking system initiated by the second virtual entity by acting on the displayed security certificate symbol to initiate a process of verification of the certification to verify whether the security certificate symbol associated with the first virtual entity represents a valid security certificate, wherein the checking system is configured to modify software of the agent computer and is deployed in the virtual universe server, and wherein the checking system is further configured to control the agent computer to generate a verification message separate to rendering of the virtual universe;

pass the initiated process of verification to the security certificate administration center to determine the validity, wherein the verification process includes comparing the first data set of the first virtual entity with a second data set of the first virtual entity, wherein the second data set is obtained from the first virtual entity at initiation of the verification process;

output a result of the validity determination; and allow the second entity to access a result of the validity determination.

18. The program product of claim 17, wherein the program code is further configured to enable the computer system to adjust an appearance of the security certificate symbol in the virtual universe based upon the result of the validity determination.

19. The program product of claim 17, wherein the program code is further configured to enable the computer system to lock the security certificate symbol with the first virtual entity and display the certification date in the virtual universe.

20. The program product of claim 17, wherein the program code is further configured to enable the computer system to associate the security certificate with at least one of: security certificate information, a user applying the security certificate for the first virtual entity, or a universally unique identification of the first virtual entity.

21. The program product of claim 17, wherein the program code is further configured to display an expiration date of the security certificate in the virtual universe and enable the computer system to store the validity determination including the data set for the first virtual entity for use in future certifying processes for the first virtual entity.

22. The program product of claim 17, wherein the program code is further configured to enable the computer system to suspend or limit at least one feature of an account of a first virtual entity determined to be using an invalid security certificate.

23. The program product of claim 22, wherein the program code is further configured to provide details of an invalid certificate for use by the second virtual entity and to control the agent computer to generate a verification message separate to rendering of the virtual universe.

24. A method for providing a system for certifying a virtual entity in a virtual universe, comprising:

at least one of: creating, maintaining, deploying or supporting a computer system including at least one computing device, the computer system being operable to:

provide a certifying system configured to enable a first virtual entity controlled by a first user to certify an identity of the first virtual entity with an independent security certificate administration center and be granted a security certificate based on the identity of the first virtual entity, wherein the certification of the identity of the first virtual entity is performed to ensure security for a real-world transaction, wherein the first user controls the first virtual entity via an agent computer communicatively coupled to a virtual universe server, wherein the certifying includes independently checking a first data set for the first virtual entity and associating a security certificate symbol with the first virtual entity, requirements of the first data set defined by the certifying system, wherein the security certificate symbol is displayed to be viewed by a second virtual entity in the virtual universe, the second virtual entity controlled by a second user and configured to conduct a transaction with the first virtual entity in the virtual world, and wherein the certificate administration center is configured to initiate operation of the certifying system and modify an interface of the agent computer to enable secure communication between the agent computer and the certificate administration center;

provide a checking system initiated by the second virtual entity by acting on the displayed security certificate symbol to initiate a process of verification of the certification to verify whether the security certificate symbol associated with the first virtual entity represents a valid security certificate using the computer system, wherein the checking system is configured to modify software of the agent computer and is deployed in the virtual universe server, and wherein the checking system is further configured to control the agent computer to generate a verification message separate to rendering of the virtual universe;

pass the initiated process of verification to the security certificate administration center to determine the validity using the computer system, wherein the verification process includes comparing the first data set of the first virtual entity with a second data set of the first virtual entity;

output a result of the validity determination using the computer system; and allow the second entity to access the result of the validity determination.

25. The method of claim 24, wherein computer infrastructure is further operable to adjust an appearance of the security certificate in the virtual world based upon the validity determination, and wherein the first virtual entity is a representation of the first user in the virtual world and the second virtual entity is a representation of the second user in the virtual world.

* * * * *